US010144483B2

(12) United States Patent
Miki et al.

(10) Patent No.: US 10,144,483 B2
(45) Date of Patent: Dec. 4, 2018

(54) BICYCLE COMPONENT CONTROL DEVICE

(75) Inventors: Yoshimitsu Miki, Osaka (JP); Kazutaka Fukao, Osaka (JP); Kentaro Kosaka, Osaka (JP)

(73) Assignee: Shimano Inc., Osaka (JP)

( * ) Notice: Subject to any disclaimer, the term of this patent is extended or adjusted under 35 U.S.C. 154(b) by 783 days.

(21) Appl. No.: 13/195,050

(22) Filed: Aug. 1, 2011

(65) Prior Publication Data

US 2013/0031998 A1 Feb. 7, 2013

(51) Int. Cl.
*B62K 23/06* (2006.01)
*B62L 3/02* (2006.01)
*B62M 25/04* (2006.01)

(52) U.S. Cl.
CPC .............. *B62L 3/023* (2013.01); *B62K 23/06* (2013.01); *B62M 25/04* (2013.01); *Y10T 74/2003* (2015.01); *Y10T 74/20037* (2015.01); *Y10T 74/20396* (2015.01); *Y10T 74/20612* (2015.01)

(58) Field of Classification Search
CPC ............................... B62K 23/06; B62M 25/04
USPC ........ 74/502.2, 489, 473.13; 188/344, 24.22, 188/24.11; 60/588
See application file for complete search history.

(56) References Cited

U.S. PATENT DOCUMENTS 4,232,565 A * 11/1980 Leonheart ........................ 74/489
4,916,967 A * 4/1990 Nakamura ................... 74/502.2
4,921,081 A * 5/1990 Chilcote ....................... 188/344
5,241,878 A 9/1993 Nagano
5,257,683 A 11/1993 Romano
6,073,730 A * 6/2000 Abe ........................... 188/24.11
6,651,523 B2 * 11/2003 Chou ........................... 74/502.2
7,546,909 B2 * 6/2009 Campbell et al. ......... 188/24.22
8,297,143 B2 * 10/2012 Fujii et al. ................. 74/473.13
8,464,844 B2 6/2013 Jordan
2004/0055840 A1 * 3/2004 Lumpkin ...................... 188/344
2004/0211617 A1 * 10/2004 Ogasawara et al. .......... 180/336
(Continued)

FOREIGN PATENT DOCUMENTS

CN 101712368 A 5/2010
CN 102101516 A 6/2011
(Continued)

OTHER PUBLICATIONS www.merriam-webster.com/dictionary/seam Oct. 5, 2014.*
(Continued)

*Primary Examiner* — Vinh Luong
(74) *Attorney, Agent, or Firm* — Global IP Counselors, LLP

(57) ABSTRACT

A bicycle component control device basically includes a bracket and a bicycle component operating unit. The bicycle component operating unit is disposed in an interior space of the bracket. The bicycle component operating unit includes an operating member protruding toward outside of the interior space. The bracket includes a plurality of bracket parts being separate pieces from each other and non-movably fixed to at least one adjacent one of the plurality of bracket parts that define the interior space. The plurality of bracket parts is further configured relative to each other such that a connecting seam formed on the bracket extends along at least three of a mounting surface, an upper surface, a lower surface, a first side surface and a second side surface of the bracket.

8 Claims, 9 Drawing Sheets

(56) References Cited

U.S. PATENT DOCUMENTS

| | | | | |
|---|---|---|---|---|
| 2008/0155982 | A1* | 7/2008 | Jones et al. | 60/588 |
| 2009/0165591 | A1* | 7/2009 | Kawakami | 74/502.2 |
| 2009/0235772 | A1* | 9/2009 | Naka et al. | 74/502.2 |
| 2010/0083786 | A1* | 4/2010 | Miki et al. | 74/489 |
| 2010/0199798 | A1 | 8/2010 | Uno | |
| 2011/0079103 | A1 | 4/2011 | Kususe et al. | |
| 2012/0160625 | A1* | 6/2012 | Jordan | 188/344 |

FOREIGN PATENT DOCUMENTS

| | | | |
|---|---|---|---|
| DE | 60 2004 010 007 | T2 | 9/2008 |
| DE | 11 2008 001 717 | B4 | 9/2013 |
| EP | 1 325 863 | B1 | 12/2002 |
| EP | 1 724 189 | B1 | 12/2009 |
| EP | 2 281 741 | A2 | 1/2010 |
| EP | 1 997 723 | B1 | 9/2010 |
| TW | I267595 | B | 12/2006 |
| TW | I286523 | B | 9/2007 |
| TW | I299312 | B | 8/2008 |
| TW | M359489 | U | 6/2009 |
| TW | 200932619 | A | 8/2009 |
| TW | 201041777 | A | 12/2010 |
| TW | 201307119 | A | 2/2013 |

OTHER PUBLICATIONS en.wiktionary.org/wiki/seam Oct. 5, 2014.*

Notice of Opposition of corresponding EP patent Application No. 12 17 8653.7 dated Dec. 19, 2016.

* cited by examiner

BICYCLE COMPONENT CONTROL DEVICE

BACKGROUND

Field of the Invention

This invention generally relates to a bicycle component control device. More specifically, the present invention relates to a bicycle component control device having a bracket with an interior space that houses a bicycle component operating unit.

Background Information

Bicycles typically include one or more bicycle component control devices for controlling various bicycle components such as a hydraulic brake device or a gear changing device. Some of these bicycle component control devices have a bracket with an interior space that houses a bicycle component operating unit. The bicycle component operating unit is often provided with one or more operating levers that extend out of the bracket such that the rider can operate the bicycle component operating unit. One example of bicycle component control devices having this type of configuration are disclosed in U.S Patent Application Publication No. 2011/0079103.

SUMMARY

It has been discovered that when a rider operates one of the operating levers of a bicycle component operating unit that is disposed inside a bracket, a stress is placed on the bracket via the bicycle component operating unit that is disposed inside the bracket. In view of this situation, one aspect presented in this disclosure is to provide a bicycle component control device having a bracket that accommodates the stress placed on the bracket due to operation of the bicycle component operating unit that is disposed in the bracket.

In view of the state of the known technology, a bicycle component control device is proposed that basically includes a bracket and a bicycle component operating unit. The bracket basically has a gripping portion and an interior space. The bicycle component operating unit is disposed in the interior space of the bracket. The bicycle component operating unit includes an operating member protruding toward outside of the interior space. The bracket includes a plurality of bracket parts being separate pieces from each other. The plurality of bracket parts is non-movably fixed to at least one adjacent one of the plurality of bracket parts and defining the interior space therebetween. The plurality of bracket parts is configured relative to each other such that the bracket has a mounting surface for mounting a bicycle handlebar, an upper surface extending from the mounting surface, a lower surface extending from the mounting surface, a first side surface extending from the mounting surface between the upper and lower surfaces, and a second side surface extending from the mounting surface between the upper and lower surfaces. The plurality of bracket parts is further configured relative to each other such that a connecting seam formed on the bracket extends along at least three of the mounting surface, the upper surface, the lower surface, the first side surface and the second side surface.

These and other objects, features, aspects and advantages of bicycle component control devices disclosed herein will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
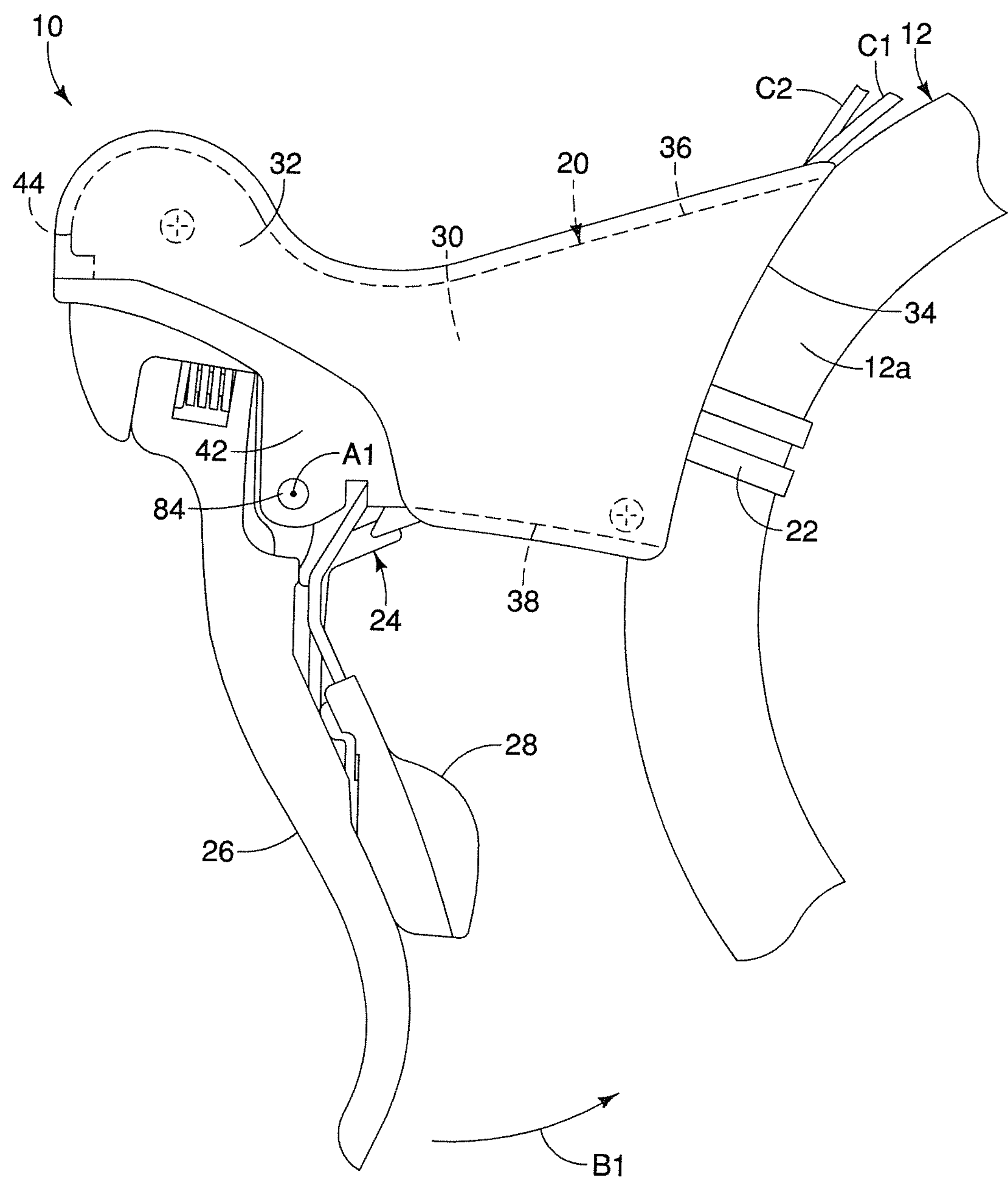
FIG. 1 is an inside elevational view of a bicycle component control device in accordance with a first embodiment.

Referring initially to FIG. 1, a bicycle component control device 10 is illustrated in accordance with a first embodiment. The bicycle component control device 10 is mounted on a drop down handlebar 12. In the illustrated embodiment, the bicycle component control device 10 is a road bicycle brake/shift device. The bicycle component control device 10 is a right hand side control device operated by the rider's right hand to operate a first brake device (not shown) and a first gear shifting device (not shown, e.g., a cable operated rear derailleur). It will be apparent to those skilled in the art that the configuration of the bicycle component control device 10 can be adapted to a. left hand side control device that is operated by the rider's left hand.

As used herein to describe the above embodiment(s), the following directional terms "upper", "lower", "forward", "rearward", "above", "downward", "vertical", "horizontal", "below" and "transverse" as well as any other similar directional terms refer to those directions of a bicycle equipped with the bicycle component control device. Accordingly, these terms, as utilized to describe the bicycle component control device should be interpreted relative to a bicycle equipped with the bicycle component control device as used in the normal riding position on a horizontal surface in an upright position. Finally, terms of degree such as "substantially", "about" and "approximately" as used herein mean a reasonable amount of deviation of the modified term such that the end result is not significantly changed.

As seen in FIGS. 1 to 4, the bicycle component control device 10 basically includes a bracket 20, a clamp 22 and a bicycle component operating unit 24 with a pair of operating members 26 and 28. As discussed below, the clamp 22 is fixed to the bracket 20 for attaching the bracket 20 to a curved portion 12*a* of the handlebar 12. The bicycle component operating unit 24 is disposed inside the bracket 20 and the operating members 26 and 28 protrude out of the bracket 20. In the first illustrated embodiment, the bicycle component operating unit 24 is a mechanical shifting unit. However, the bicycle component operating unit 24 is not limited to a mechanical shifting unit. Rather, as will become apparent from the later embodiments, the bicycle component operating unit 24 can be an electric control unit that is either a non-shifting control unit or an electric shift unit. Moreover, the bicycle component operating unit 24 can be a hydraulic brake unit. In addition, the bracket 20 can also be configured to support two or more operating units such as, but not limited to, a hydraulic brake unit, a mechanical shifting unit, a non-shifting control unit and an electric shift unit.

As seen in FIG. 1, the bracket 20 has a gripping portion 30 disposed between a pivot axis A1 of the operating member 26 and the clamp 22. Typically, the bracket 20 is made of a rigid, hard material. Thus, a grip cover 32 is stretched over at least the gripping portion 30 of the bracket 20 to provide a cushion to the portion 30 of the bracket 20 and to provide an attractive appearance. Typically, the grip cover 32 is made of elastic material such as rubber.

Figure 2:
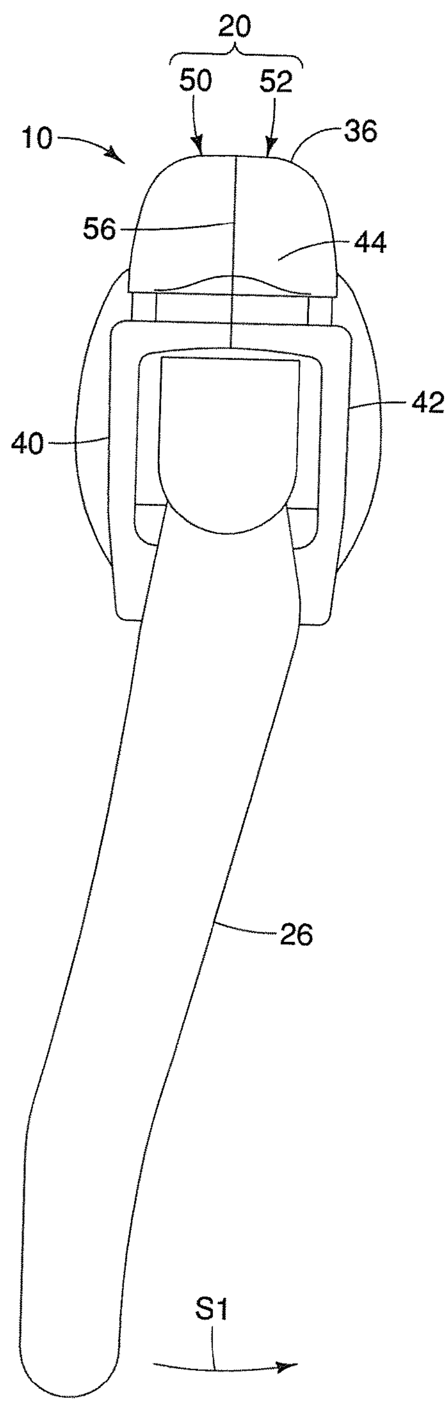
FIG. 2 is a front elevational view of the bicycle component control device illustrated in FIG. 1 with the brake/shift operating lever and the shift (release) lever in their rest positions.
Figure 3:
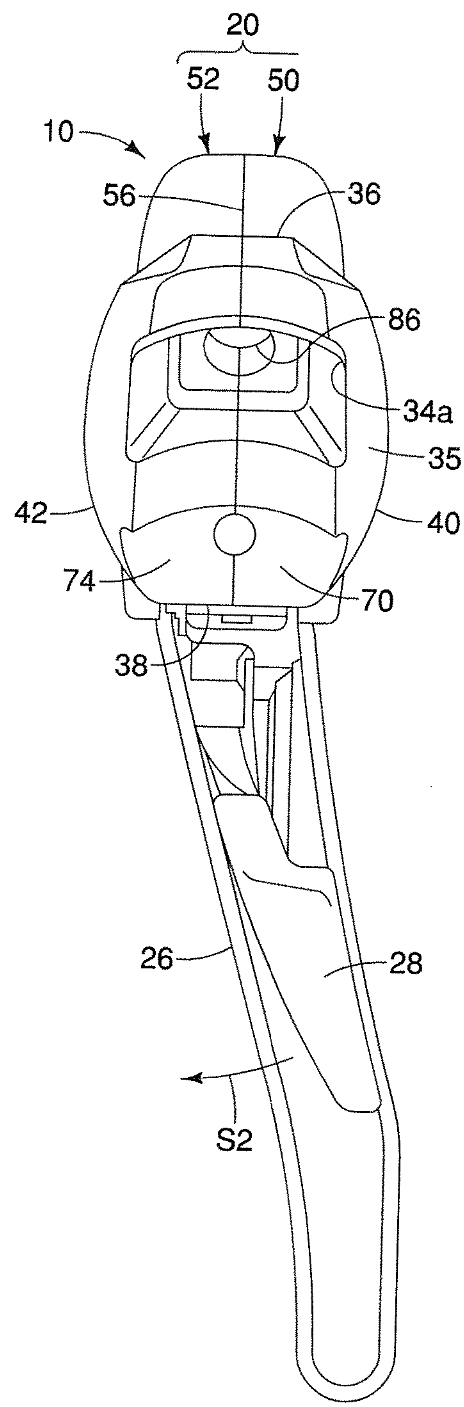
FIG. 3 is a rear elevational view of the bicycle component control device illustrated in FIGS. 1 and 2 with the brake/shift operating lever and the shift (release) lever in their rest positions.
Figure 4:
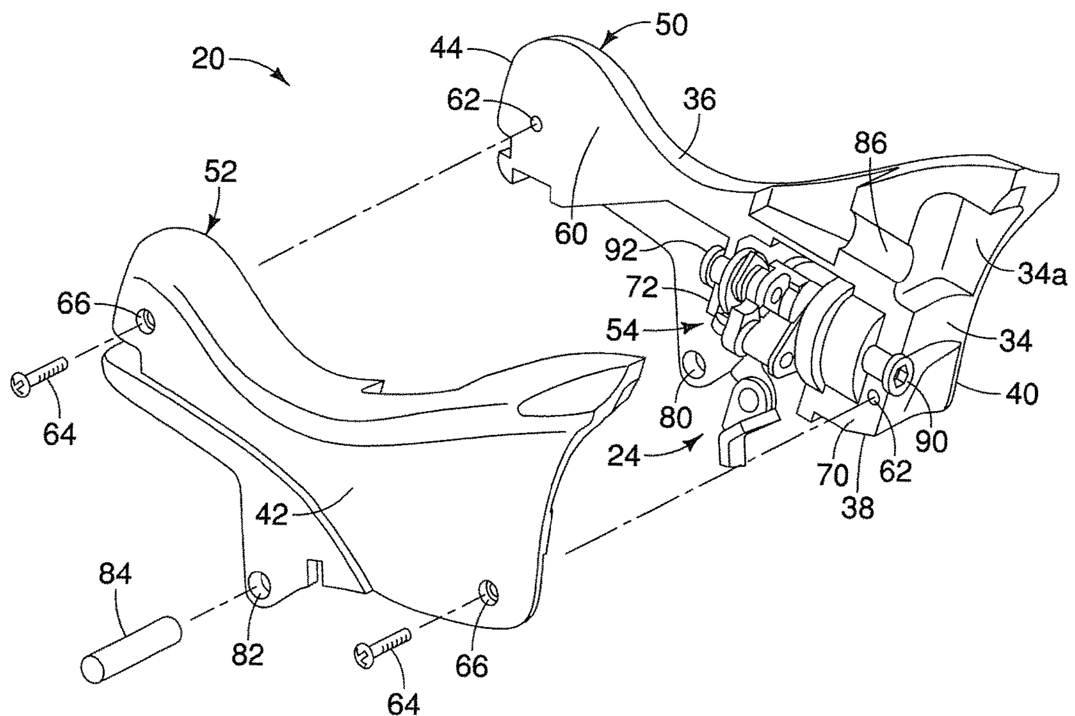
FIG. 4 is an exploded perspective view of the bicycle component control device illustrated in FIGS. 1 to 3.
Figure 5:
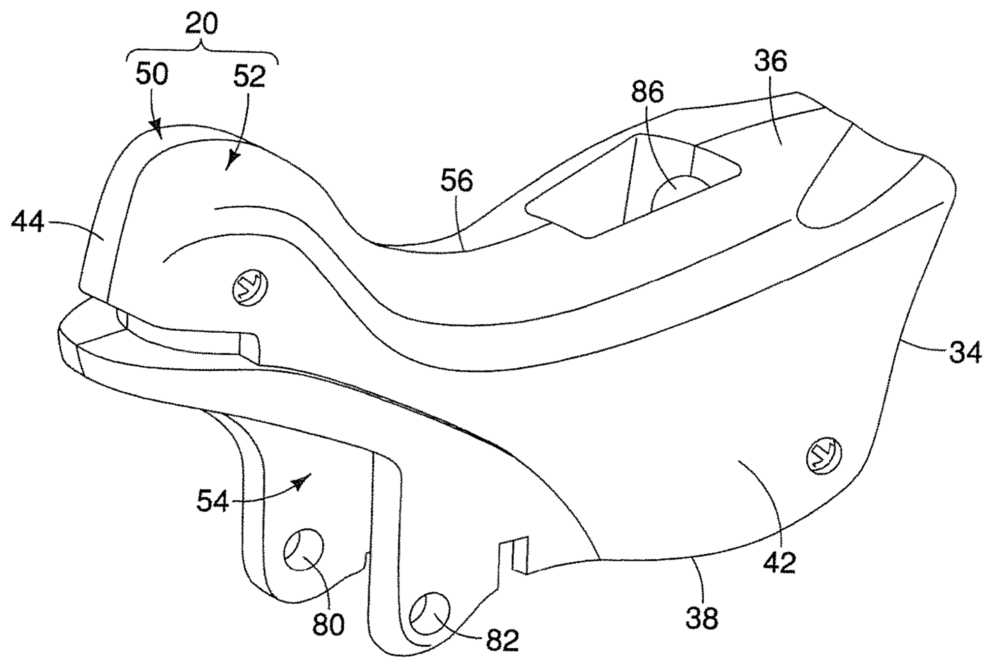
FIG. 5 is a perspective view of the bracket that supports the bicycle component operating unit of the bicycle component control device illustrated in FIGS. 1 to 4.
Figure 6:
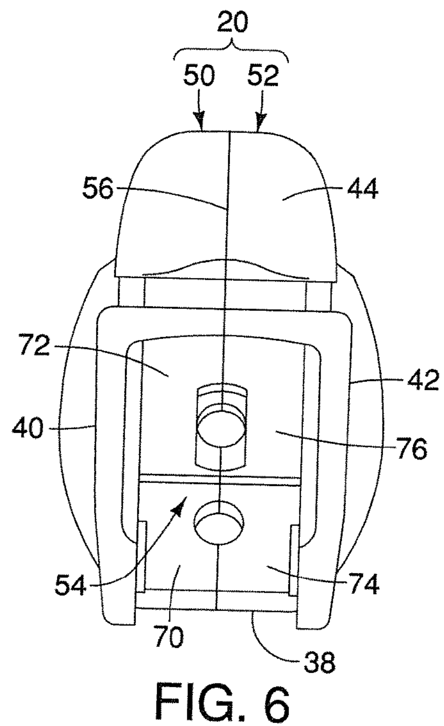
FIG. 6 is a front elevational view of the bracket illustrated in FIG. 5 for supporting the bicycle component operating unit illustrated in FIGS. 1 to 4.
Figure 7:
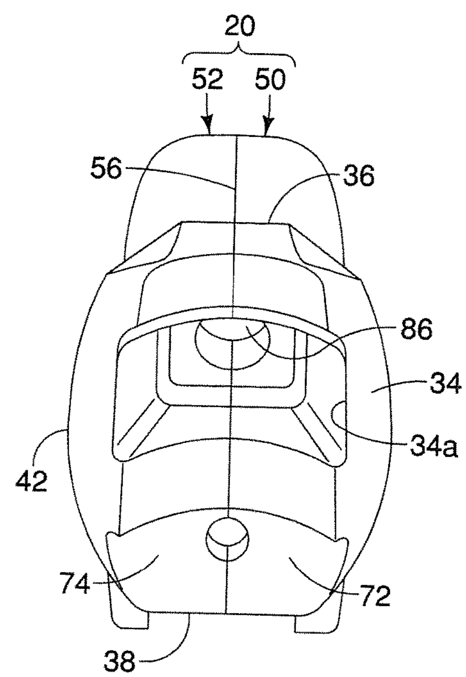
FIG. 7 is a rear elevational view of the bracket illustrated in FIGS. 5 and 6 for supporting the bicycle component operating unit illustrated in FIGS. 1 to 4.
Figure 8:
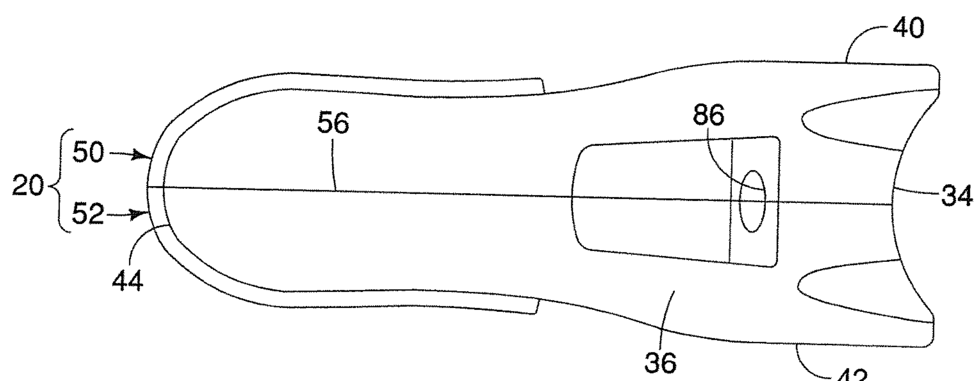
FIG. 8 is a top plan view of the bracket illustrated in FIGS. 5 to 7 for supporting the bicycle component operating unit illustrated in FIGS. 1 to 4.
Figure 9:
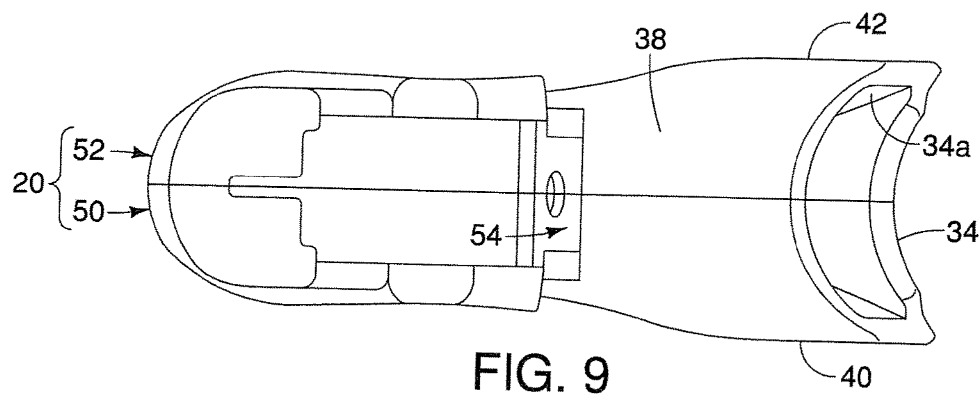
FIG. 9 is a bottom plan view of the bracket illustrated in FIGS. 5 to 8 for supporting the bicycle component operating unit illustrated in FIGS. 1 to 4.
Figure 10:
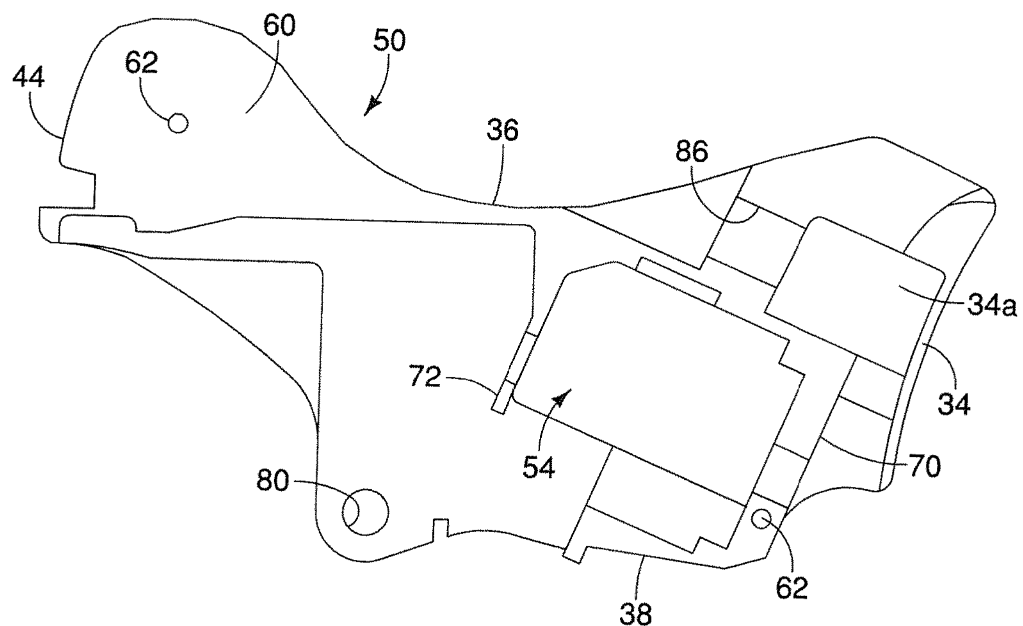
FIG. 10 is an interior side elevational view of the bracket illustrated in FIGS. 5 to 9 of one of the bracket parts for supporting the bicycle component operating unit illustrated in FIGS. 1 to 4.

Referring now to FIGS. 1 to 3, the bracket 20 has a mounting surface 34, an upper surface 36, a lower surface 38, a first side surface 40 and a second side surface 42. The mounting surface 34 has a recess 34*a* for receiving the clamp 22 for mounting the mounting surface 34 against the bicycle handlebar 12. Preferably, the mounting surface 34 has a generally curved configuration that mates with the curvatures of the curved portion 12*a* of the bicycle handlebar 12. The upper surface 36 extends from the mounting surface 34 to a free end 44 of the bracket 20. The lower surface 38 extends from the mounting surface 34 to the free end 44 of the bracket 20. The first side surface 40 extends from the mounting surface 34 to the free end 44 of the bracket 20 in the area between the upper and lower surfaces 36 and 38. The second side surface 42 extends from the mounting surface 34 to the free end 44 of the bracket 20 in the area between the upper and lower surfaces 36 and 38.

Referring now to FIGS. 4 to 10, the bracket 20 includes a first bracket part 50 and a second bracket part 52. The first and second bracket parts 50 and 52 are separate pieces from each other, and mate together to define an interior space 54. The interior space 54 is configured to constitute an operating unit receiving cavity. Thus, the bicycle component operating unit 24 is disposed in the interior space 54 formed between the first and second bracket parts 50 and 52 of the bracket 20. The first and second bracket parts 50 and 52 are non-movably fixed to each other for defining the interior space 54 therebetween such that the first and second bracket parts 50 and 52 both support the bicycle component operating unit 24.

The first and second bracket parts 50 and 52 are further configured relative to each other such that a connecting seam 56 is formed on the exterior surface of the bracket 20. In this first embodiment, the connecting seam 56 is formed between the first and second bracket parts 50 and 52 such that the connecting seam 56 separates the bracket 20 along the mounting surface 34, the upper surface 36, the lower surface 38 and the free end 44. However, as will be apparent from the later embodiments, the connecting seam 56 can have other configurations. For the purpose of strength and durability, the connecting seam 56 extends along at least three of mounting surface 34, the upper surface 36, the lower surface 38, the first side surface 40 and the second side surface 42.

In the first illustrated embodiment, the first and second bracket parts 50 and 52 are each made of a rigid, hard plastic material. Preferably, as illustrated, the first and second bracket parts 50 and 52 are formed by injection molding. Thus, the first and second bracket parts 50 and 52 are injection molded parts in the illustrated embodiment. More preferably, each of the first and second bracket parts 50 and 52 is formed using a draw molding machine using two molds or dies such that the first and second bracket parts 50 and 52 are formed without hidden surfaces. The draw direction refers to the direction in which the two molds or dies will separate to release from the bracket part 50 or 52 from the two molds or dies. The draw direction is also called a line of draw. In the context of injection molded parts, the term "hidden surface" refers to a surface of the injection molded part that cannot be seen while viewing the injection molded part in the draw direction. These hidden surfaces of the injection molded parts are often formed using slides that move into a cavity perpendicular to the draw direction for creating undercuts or overhanging features. Thus, as illustrated, the first and second bracket parts 50 and 52 are injection molded parts that have no hidden surfaces with respect to the draw direction. In this way, the molds or dies can be relatively simple, and the bracket part 50 or 52 can be easily ejected from the molds or dies.

In the illustrated embodiment, the first and second bracket parts 50 and 52 are mirror images of each other, except that the first bracket part 50 has an interior face 60 that has a pair of blind bores 62 for threadedly receiving a pair of fasteners or screws 64, respectively, while the second bracket part 52 has a pair of stepped through bores 66 for receiving the fasteners 64 therethrough. Since the through bores 66 are stepped, the head of the fasteners 64 are recessed from the exterior surface of the second bracket part 52. Thus, the first and second bracket parts 50 and 52 are non-movably fixed to each other by the fasteners 64. Of course, other types of fastening arrangements can be used to non-movably fix the first and second bracket parts 50 and 52 together as needed and/or desired.

In the first illustrated embodiment, the first bracket part 50 has a pair of support portions 70 and 72 that are configured and arranged to contact and support a first side of the bicycle component operating unit 24. Likewise, the second bracket part 52 has a pair of support portions 74 and 76 that are configured and arranged to contact and support a second side of the bicycle component operating unit 24. In the first illustrated embodiment, the support portions 70 72, 74 and 76 constitute shaft engagement portions of the bracket 20.

In the first illustrated embodiment, the first bracket part 50 has a first pivot hole 80 and the second bracket part 52 has a second pivot hole 82. The first and second pivot holes 80 and 82 receive a pivot pin 84 that defines the pivot axis A1. The pivot pin 84 pivotally supports the operating member 26 to the bracket 20 for movement in a direction B1 (FIG. 1).

The clamp 22 is a conventional handlebar clamp that is often used for road style shifters. In the first illustrated embodiment, the clamp 22 is sandwiched between the first and second bracket parts 50 and 52. In particular, the first and second bracket parts 50 and 52 mate together to form the clamp receiving recess 34*a*, as mentioned above, and a bolt receiving recess 86.

In the first illustrated embodiment, the bicycle component operating unit 24 is a conventional mechanical shifting unit that pulls or releases a shift cable C1 (FIG. 1) that is connected to a gear shifting device. The operating member 26 is configured to perform a cable pulling operation, while the operating member 28 is configured to perform a cable releasing operation. Thus, the operating member 26 constitutes a pulling lever, while the operating member 28 constitutes a release lever. The operating member 26 is also configured to perform a braking operation by pulling a brake cable C2. Thus, the operating member 26 constitutes a brake/shift operating lever that functions as a brake lever by the rider pivoting the operating member 26 about the pivot axis A1 relative to the bracket 20 towards the curved portion 12*a* of the handlebar 12. As seen in FIGS. 2 and 3, operating members 26 and 28 are moved in a lateral direction towards a vertical longitudinal center plane of the bicycle to perform shifting operations. The bicycle component operating unit 24 has a pair of mounting fasteners 90 and 92 that are supported by the support portions 70, 72, 74 and 76 of the first and second bracket parts 50 and 52. The mounting fasteners 90 and 92 are fixed to a main axle structure of the bicycle component operating unit 24. The first and second bracket parts 50 and 52 can be provided with other structures that cooperate with the bicycle component operating unit 24 to aid in supporting and/or the operation of the bicycle component operating unit 24 as needed and/or desired.

It will be apparent from this disclosure that any type of mechanical shifting unit can be used with the bracket 20 by reconfiguring the interior space 54 to match the configuration of the mechanical shifting unit. Thus the bicycle component operating unit 24 will not be discussed in further detail herein.

Figure 11:
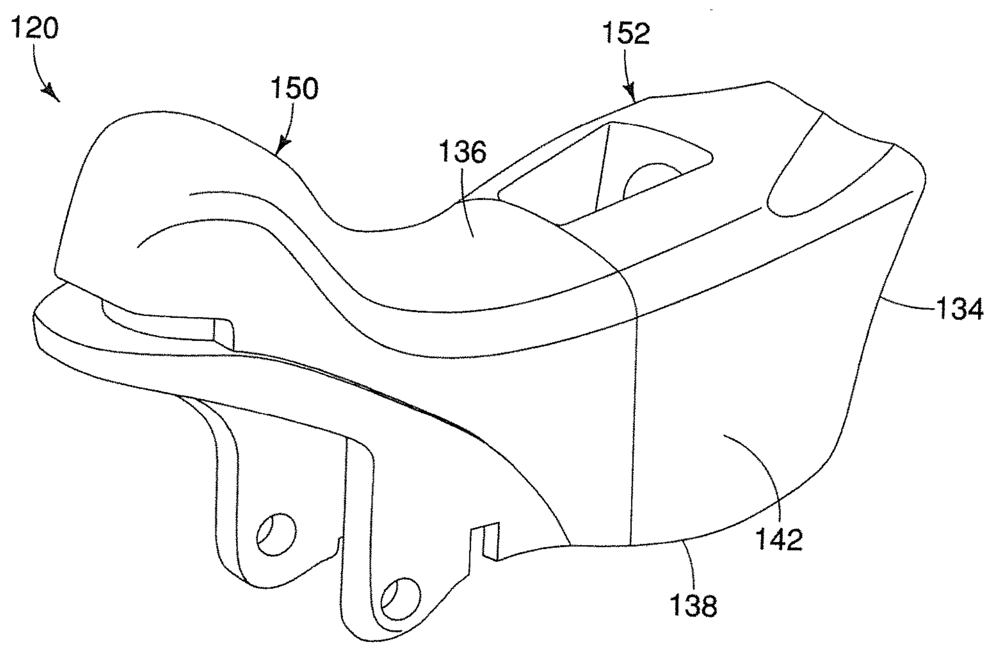
FIG. 11 is a perspective view of a bracket in accordance with a second embodiment that supports the bicycle component operating unit illustrated in FIGS. 1 to 4.
Figure 12:
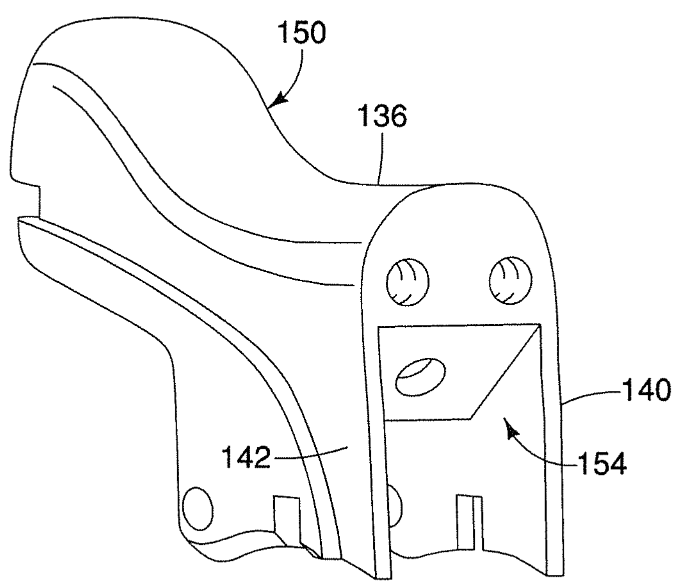
FIG. 12 is a perspective view of the first bracket part of the bracket illustrated in FIG. 11.
Figure 13:
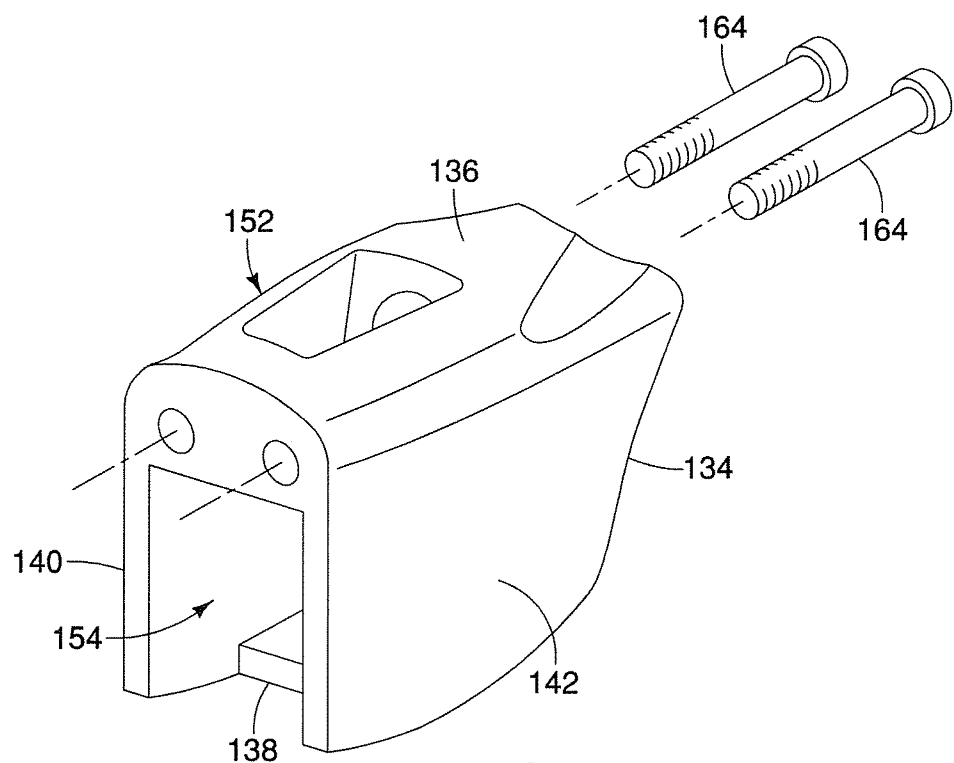
FIG. 13 is a perspective view of the second bracket part of the bracket illustrated in FIG. 11.

Referring now to FIGS. 11 to 13, a bracket 120 in accordance with a second embodiment will now be explained. The bracket 120 is configured to be used with the clamp 22 and the bicycle component operating unit 24 of the first embodiment. The bracket 120 has a mounting surface 134, an upper surface 136, a lower surface 138, a first side surface 140 and a second side surface 142. Here, the bracket 120 includes a first bracket part 150 and a second bracket part 152. The first and second bracket parts 150 and 152 are separate pieces from each other, and mate together to define an interior space 154. The first and second bracket parts 150 and 152 are non-movably fixed to each other by a pair of fasteners or screws 164. The first and second bracket parts 150 and 152 are further configured relative to each other such that a connecting seam 156 is formed on the exterior surface of the bracket 120. In this second embodiment, the connecting seam 156 is formed between the first and second bracket parts 150 and 152 such that the connecting seam 156 separates the bracket 120 along the upper surface 136, the lower surface 138 and the first and second side surfaces 140 and 142. When the first and second bracket parts 150 and 152 are fixed together, the bracket 120 is identical to the bracket 20 except for orientation of the connecting seam 156 and the fastening arrangement between the first and second bracket parts 150 and 152 using the fasteners or screws 164.

Figure 14:
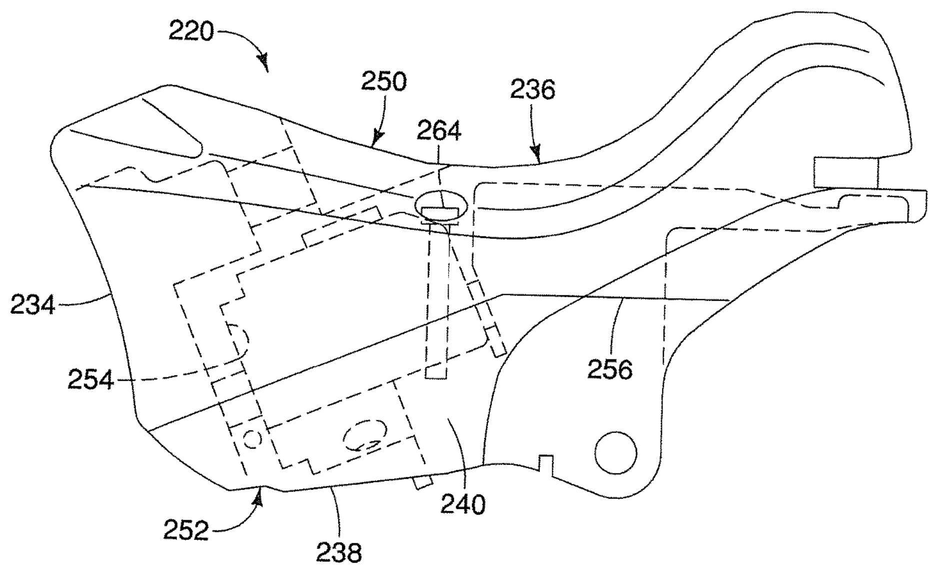
FIG. 14 is an outside elevational view of a bracket in accordance with a third embodiment that supports the bicycle component operating unit illustrated in FIGS. 1 to 4.
Figure 15:
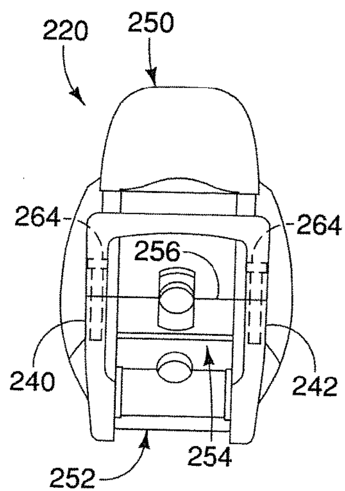
FIG. 15 is a front elevational view of the bracket that is illustrated in FIG. 14.

Referring now to FIGS. 14 and 15, a bracket 220 in accordance with a third embodiment will now be explained. The bracket 220 is configured to be used with the clamp 22 and the bicycle component operating unit 24 of the first embodiment. The bracket 220 has a mounting surface 234, an upper surface 236, a lower surface 238, a first side surface 240 and a second side surface 242. Here, the bracket 220 includes a first bracket part 250 and a second bracket part 252. The first and second bracket parts 250 and 252 are separate pieces from each other, and mate together to define an interior space 254. The first and second bracket parts 250 and 252 are non-movably fixed to each other by a pair of fasteners or screws 264. The first and second bracket parts 250 and 252 are further configured relative to each other such that a connecting seam 256 is formed on the exterior surface of the bracket 220. In this third embodiment, the connecting seam 256 is formed between the first and second bracket parts 250 and 252 such that the connecting seam 256 separates the bracket 220 along the mounting surface 234 and the first and second side surfaces 240 and 242. When the first and second bracket parts 250 and 252 are fixed together, the bracket 220 is identical to the bracket 20 except for orientation of the connecting seam 256 and the fastening arrangement between the first and second bracket parts 250 and 252 using the fasteners or screws 264.

Figure 16:
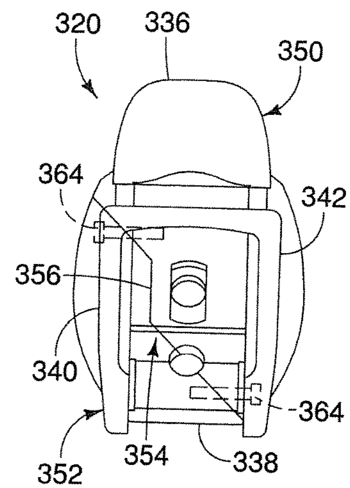
FIG. 16 is a front elevational view of a bracket in accordance with a fourth embodiment that supports the bicycle component operating unit illustrated in FIGS. 1 to 4.
Figure 17:
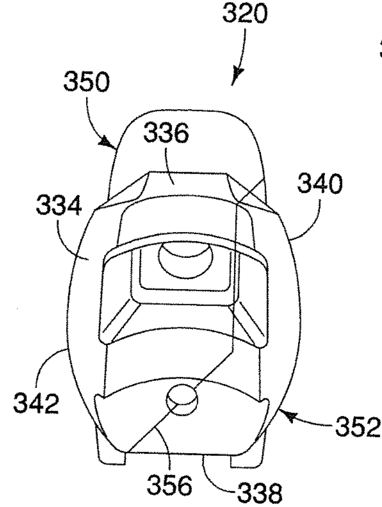
FIG. 17 is a rear elevational view of the bracket that is illustrated in FIG. 16.

Referring now to FIGS. 16 and 17, a bracket 320 in accordance with a fourth embodiment will now be explained. The bracket 320 is configured to be used with the clamp 22 and the bicycle component operating unit 24 of the first embodiment. The bracket 320 has a mounting surface 334, an upper surface 336, a lower surface 338, a first side surface 340 and a second side surface 342. Here, the bracket 320 includes a first bracket part 350 and a second bracket part 352. The first and second bracket parts 350 and 352 are separate pieces from each other, and mate together to define interior space 354. The first and second bracket parts 350 and 352 are non-movably fixed to each other by a pair of fasteners or screws 364. The first and second bracket parts 350 and 352 are further configured relative to each other such that a connecting seam 356 is formed on the exterior surface of the bracket 320. In this fourth embodiment, the connecting seam 356 is formed between the first and second bracket parts 350 and 352 such that the connecting seam 356 separates the bracket 320 along the mounting surface 334, the lower surface 338 and the first side surface 340. Alternatively, the connecting seam can be formed such that the connecting seam separates the bracket 320 into two bracket parts such that the connecting seam separates the bracket 320 along the mounting surface 334, the upper surface 336 and the second side surface 342. When the first and second bracket parts 350 and 352 are fixed together, the bracket 320 is identical to the bracket 20 except for orientation of the connecting seam 356 and the fastening arrangement between the first and second bracket parts 350 and 352 using the fasteners or screws 364.

Figure 18:
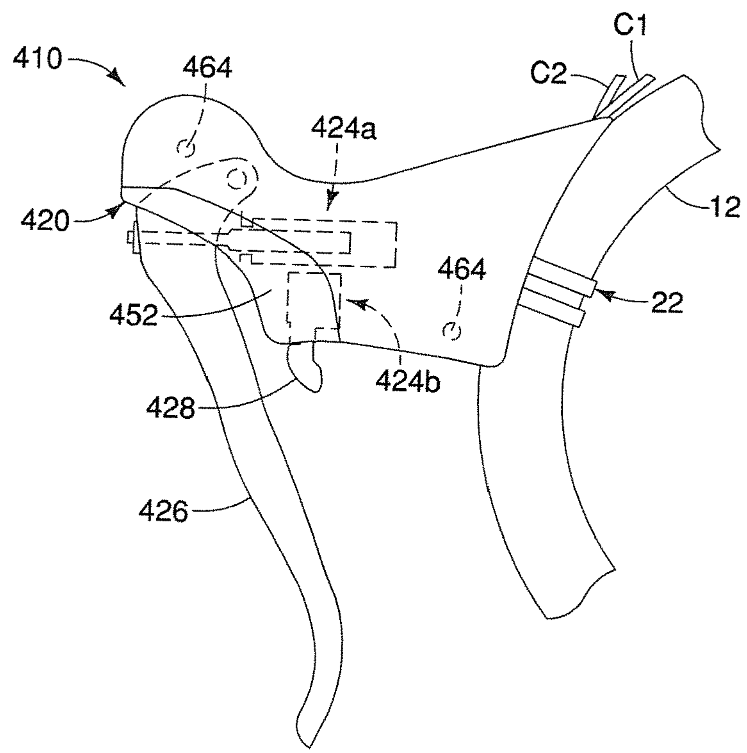
FIG. 18 is an inside elevational view of a bicycle component control device in accordance with a fifth embodiment.
Figure 19:
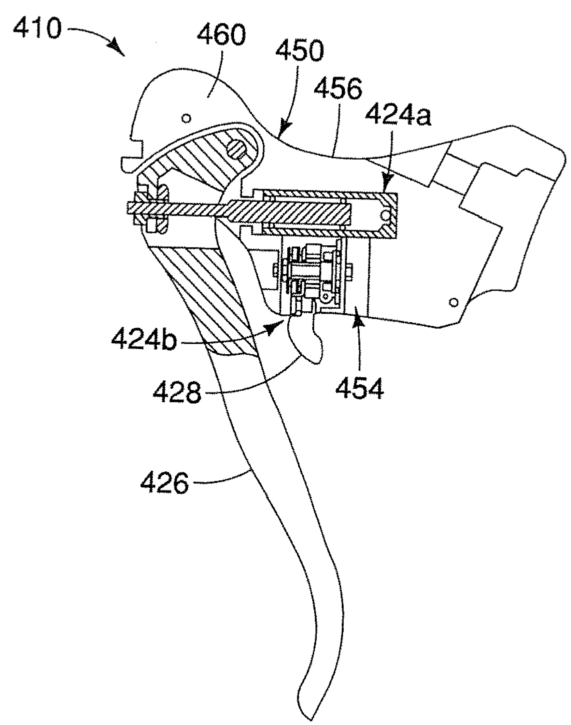
FIG. 19 is an interior side elevational view of the bracket illustrated in FIG. 18 of one of the bracket parts for supporting a hydraulic brake unit and a mechanical shifting unit.

Referring now to FIGS. 18 and 19, a bicycle component control device 410 in. accordance with a fifth embodiment will now be explained, The bicycle component control device 410 has a bracket 420 is configured to be used with the clamp 22 of the first embodiment. Here, the bracket 420 includes a first bracket part 450 and a second bracket part 452. The first and second bracket parts 450 and 452 are separate pieces from each other, and mate together to define an interior space 454. The first and second bracket parts 450 and 452 are non-movably fixed to each other by a pair of fasteners or screws 464. The first and second bracket parts 450 and 452 are further configured relative to each other such that a longitudinal connecting seam 456 (i.e., the outline of the interior face 460) is formed on the exterior surface of the bracket 420 as seen in FIG. 19. Basically, the longitudinal connecting seam 456 divides the bracket 420 in two halves that are basically mirrors images in the same manner as the first embodiment. In this fifth embodiment, the first and second bracket parts 450 and 452 are further configured relative to each other to accommodate and support a hydraulic brake unit 424A and a mechanical shifting unit 424B. Since the first and second bracket parts 450 and 452 can be configured to accommodate and support any hydraulic brake unit and any mechanical shifting unit, the hydraulic brake unit 424A and the mechanical shifting unit 424B will not be discussed and or illustrated in detail herein. In other words, although the interior space 454 of the bracket 420 is different, the bracket 420 separates into two pieces in basically the same manner as the bracket 20, discussed above. Thus, each of the hydraulic brake unit 424A and the mechanical shifting unit 424B constitutes a bicycle component operating unit that is disposed in the interior space 454 of the bracket 420. Also the hydraulic brake unit 424A includes an operating member or brake lever 426 that protrudes toward outside of the interior space 454 of the bracket 420. Similarly, the mechanical shifting unit 424B includes an operating member or shift lever 428 that protrudes toward outside of the interior space 454 of the bracket 420. Here the operating member lever 428 performs both a cable pulling operation and a cable releasing operation.

Figure 20:
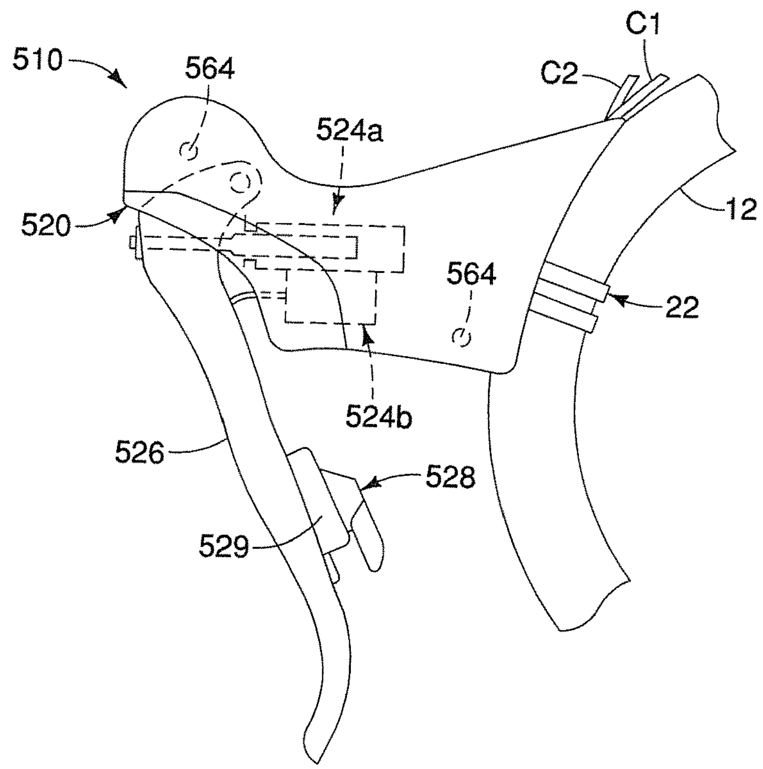
FIG. 20 is an inside elevational view of a bicycle component control device in accordance with a sixth embodiment.
Figure 21:
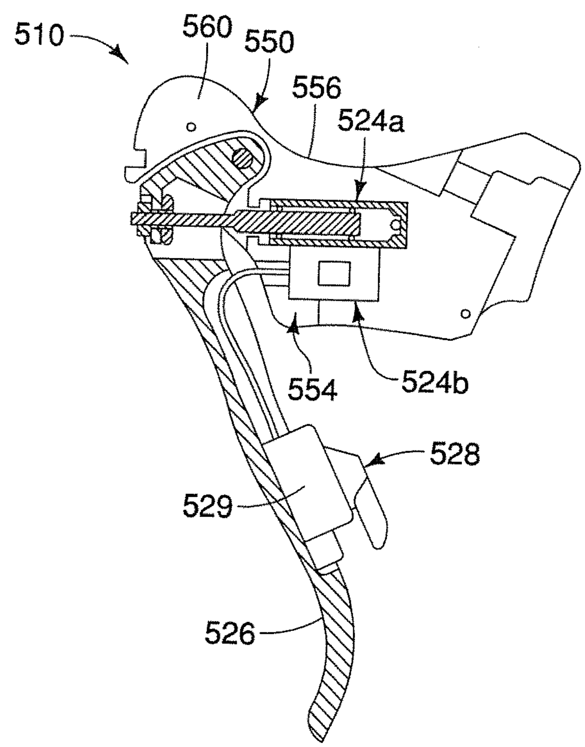
FIG. 21 is an interior side elevational view of the bracket illustrated in FIG. 20 of one of the bracket parts for supporting a hydraulic brake unit and an electric control unit that can be either an electric shift unit or a non-shifting control unit.

Referring now to FIGS. 20 and 21, a bicycle component control device in accordance with a sixth embodiment will now be explained. The bicycle component control device 510 has a bracket 520 configured to be used with the clamp 22 of the first embodiment. Here, the bracket 520 includes a first bracket part 550 and a second bracket part 552. The first and second bracket parts 550 and 552 are separate pieces from each other, and mate together to define an interior space 554. The first and second bracket parts 550 and 552 are non-movably fixed to each other by a pair of fasteners or screws 564. The first and second bracket parts 550 and 552 are further configured relative to each other such that a longitudinal connecting seam 556 (i.e., the outline of the interior face 560) is formed on the exterior surface of the bracket 520 as seen in FIG. 21. Basically, the longitudinal connecting seam 556 divides the bracket 520 in two halves that are basically mirrors images in the same manner as the first embodiment. In this sixth embodiment, the first and second bracket parts 550 and 552 are further configured relative to each other to accommodate and support a hydraulic brake unit 524A and an electric control unit 524B that can be either an electric shift unit or a non-shifting control unit. Since the first and second bracket parts 550 and 552 can be configured to accommodate and support any hydraulic brake unit and any electric control unit, the hydraulic brake unit 524A and the electric control unit 524B will not be discussed-and/or illustrated in detail herein In other words, although the interior space 554 of the bracket 520 is different, the bracket 520 separates into two pieces in basically the same manner as the bracket 20, discussed above. Thus, each of the hydraulic brake unit 524A and the electric control unit 524B constitutes a bicycle component operating unit that is disposed in the interior space 554 of the bracket 520. Also the hydraulic brake unit 524A includes an operating member or brake lever 526 that protrudes toward outside of the interior space 554 of the bracket 520, Similarly, the electric control unit 524B includes an operating member or shift lever 528 that is located on the operating member 526, and thus, protrudes outside of the interior space 554 of the bracket 520. Here, the operating member lever 528 has a switch unit 529 that performs both an upshifting operation by rotating the operating member lever 528 in a first direction and a downshifting operation by rotating the operating member lever 528 in a second (opposite) direction.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the connecting seam can be changed so long as the connecting seam extends along at least three of the mounting surface, the upper surface, the lower surface, the first side surface and the second side surface. For example, in the fifth and sixth embodiments, the bracket parts can be divides such that the connecting seam is similar to any one of the second, third or fourth embodiments. In the case of the fourth embodiment, the connecting seam can separate the bracket along one of the first and second side surfaces, one of the upper and lower surfaces, and the mounting surface as needed and/or desired. Thus, the foregoing descriptions of the embodiments according to the present invention are provided for illustration only, and not for the purpose of limiting the invention as defined by the appended claims and their equivalents.

What is claimed is:

1. A bicycle component control device comprising:

a bracket having a gripping portion and an interior space;

a bicycle component operating unit disposed in the interior space of the bracket, the bicycle component operating unit including an operating member protruding toward outside of the interior space, the bracket including a plurality of bracket parts consisting of a first bracket part and a second bracket part which are separate pieces from each other, the plurality of bracket parts being non-movably fixed to at least one adjacent one of the plurality of bracket parts and defining the interior space therebetween, the plurality of bracket parts being configured relative to each other such that the bracket has a mounting surface for mounting a bicycle handlebar, an upper surface extending from the mounting surface, a lower surface extending from the mounting surface, a first side surface extending from the mounting surface between the upper and lower surfaces, and a second side surface extending from the mounting surface between the upper and lower surfaces, the plurality of bracket parts being further configured relative to each other such that a connecting seam formed on the bracket extends along at least three of the mounting surface, the upper surface, the lower surface, the first side surface and the second side surface, the connecting seam being formed between the first and second bracket parts such that the connecting seam separates the bracket along the upper surface, the lower surface and the mounting surface; and a handlebar clamp attached to the mounting surface of the bracket, the mounting surface including a recess configured to receive the handlebar clamp, the connecting seam extending along the mounting surface so as to divide the recess into two parts.

2. The bicycle component control device according to claim 1, wherein the bicycle component operating unit is a mechanical shifting unit.

3. The bicycle component control device according to claim 1, wherein the operating member is pivotally attached to at least one of the first and second bracket parts.

4. The bicycle component control device according to claim 3, wherein the operating member is pivotally attached to both of the first and second bracket parts.

5. The bicycle component control device according to claim 1, wherein the plurality of bracket parts are non-movably fixed to the at least one adjacent one of the plurality of bracket parts by a fastening member, respectively.

6. The bicycle component control device according to claim 1, wherein the connecting seam bisects the recess.

7. The bicycle component control device according to claim 1, wherein the connecting seam intersects a mounting fastener hole arranged to receive a mounting fastener of the bicycle component operating unit.

8. The bicycle component control device according to claim 1, wherein the connecting seam divides the bracket such that the operating member is pivotally supported on two distinct sides of the connecting seam.

* * * * *